Jan. 26, 1937.  C. A. BRAUN  2,069,129
COLLECTOR RING AND DISTRIBUTOR
Filed March 9, 1936  2 Sheets-Sheet 2
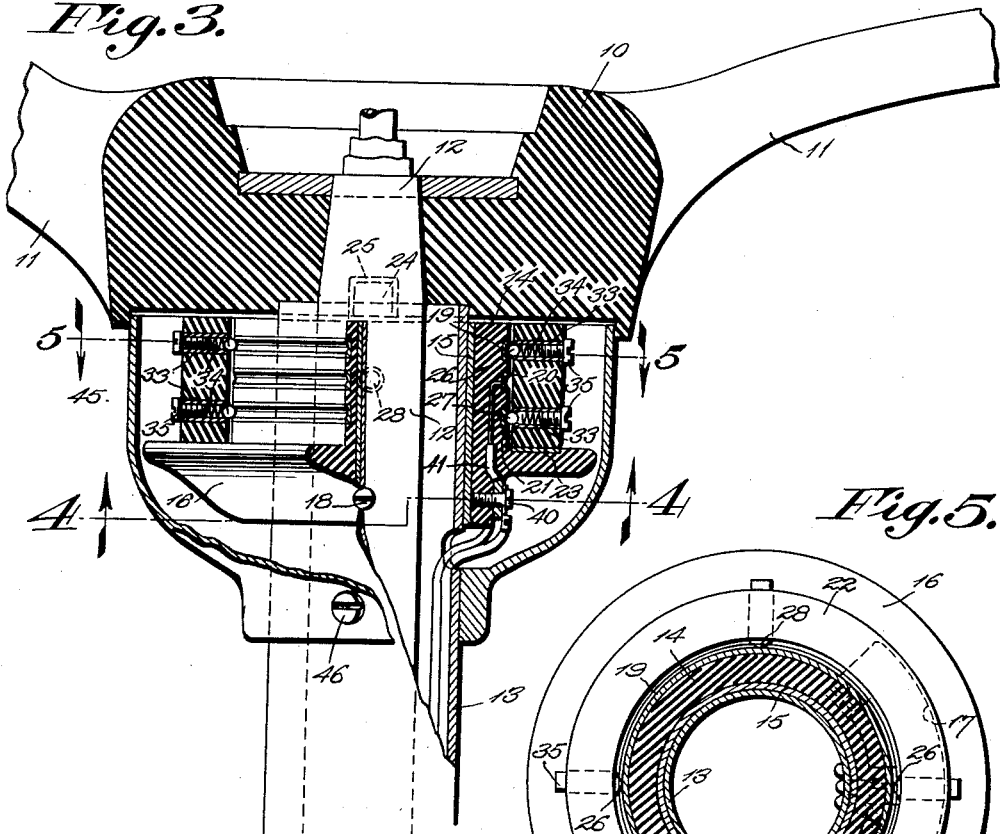
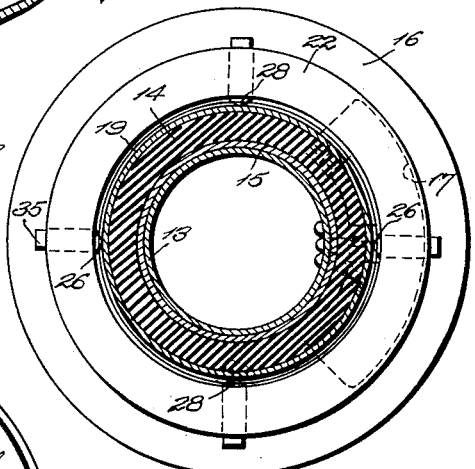
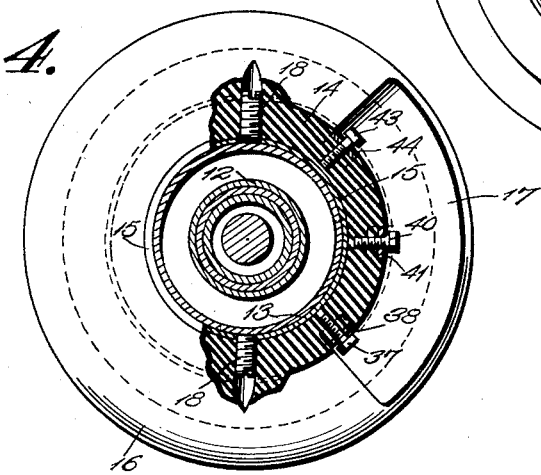
Constantine A. Braun
INVENTOR
BY Victor J. Evans & Co.
ATTORNEY Patented Jan. 26, 1937

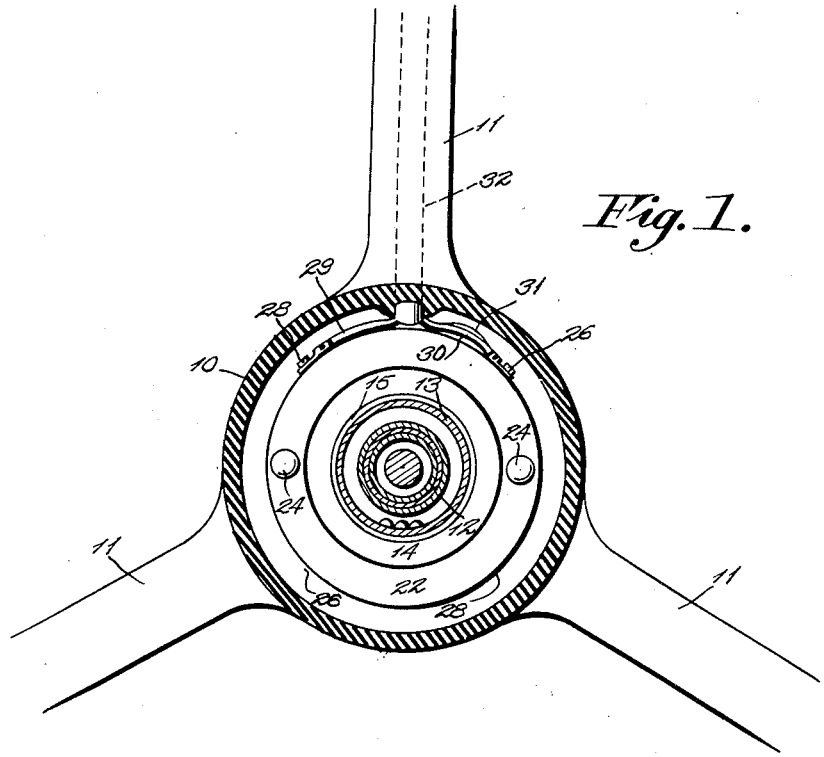
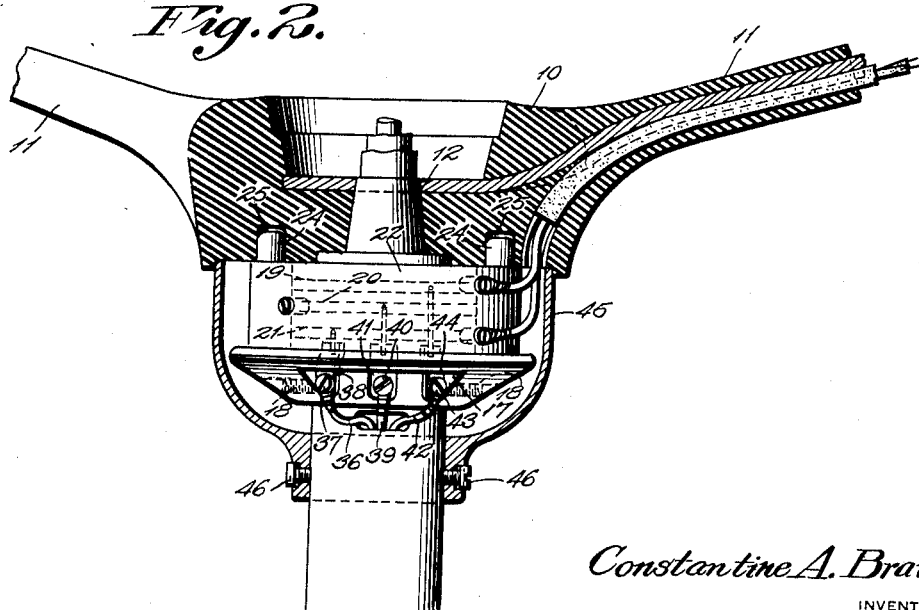

2,069,129

UNITED STATES PATENT OFFICE 2,069,129

COLLECTOR RING AND DISTRIBUTOR

Constantine A. Braun, Pottsville, Pa.

Application March 9, 1936, Serial No. 67,963

1 Claim. (Cl. 173—324)

This invention relates to collector rings and distributors for motor vehicle turn indicators.

An object of the invention is to provide a novel collector ring adapted to be mounted stationary on the steering column underneath the steering wheel and having annular contact rings for the circuit wires to the battery and to the signal lamps, the collector ring having a flared base to revolubly support the distributor so that the latter will turn evenly and smoothly as a unit with the steering wheel without danger of accidental displacement.

A further object of the invention is to provide a distributor adapted to be rotated by the steering wheel in a circular path concentric with the collector ring and outside of the collector ring, there being novel anti-friction brushes carried by the distributor and capable of being tensioned when necessary to provide good electrical connection with the contact rings.

A further object is to provide apparatus of the above described type which will be formed of a few strong, simple and durable parts, which will be inexpensive to manufacture, and which will not get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1 is a detail sectional view through the hub of a conventional steering wheel showing the same equipped with the invention, the latter being shown in plan.

Figure 2 is a cross sectional view through the parts in Figure 1 with the collector ring and distributor shown in elevation.

Figure 3 is an enlarged cross sectional view through the parts shown in Figure 1 and showing the circuit wires, contact rings and brushes.

Figure 4 is a cross sectional view taken on the line 4—4 of Figure 3 looking in the direction of the arrowheads.

Figure 5 is a cross sectional view taken on the line 5—5 of Figure 3 showing the distributor in plan.

Referring now to the drawings in which like characters of reference designate similar parts in the various views, 10 designates the hub of a steering wheel having the usual spokes 11, the steering wheel being fixed to the steering post 12 in the vehicle steering column 13, these parts being of conventional type.

In carrying out the invention, a collector ring 14 for supporting stationary contacts for circuit wires to the battery and to the signal lamps, is mounted on the steering column 13. The collector ring is preferably formed of insulating material such as "bakelite" and is reinforced axially by means of a metal tube 15. The ring is provided with an integral base flange 16 having a recess 17 on the underneath side, as shown best in Figures 2 and 4, which receives the ends of the circuit wires, as will be presently explained. A pair of screws 18 are passed through diametrically opposite points of the flange and through the reinforcing tube 15 to engage the steering column 13 and anchor the collector ring stationary upon the column.

The collector ring is provided with three annular contact rings 19, 20 and 21, as best shown in Figure 3, these rings extending circumferentially around the collector ring and being imbedded therein so that the exposed faces are flush with the surface of the collector ring. The outer surface of each ring is concave and forms a track for an associated ball brush carried by the distributor.

The distributor 22 is an annulus of insulating material such as "bakelite" and is disposed concentric with the collector ring outside of the latter. The distributor is rotatably supported upon the top face of the base flange 16 and a wear plate 23 is imbedded in the top face of the flange to reduce friction between the flange and the distributor. The distributor is provided at diametrically opposite points in the upper edge with pins 24, best shown in Figure 1, which are engaged in recesses 25 in the bottom face of the steering wheel hub and secure the distributor to turn as a unit with the steering wheel.

The ball brushes are arranged in duplicate sets of three brushes each, two ball brushes 26 and 27 of each set being arranged radially in superposed position at diametrically opposite points in the distributor 22, as best shown in Figure 3, and engaging respectively in the concave upper and lower contact rings 19 and 21. The third ball brushes 28 of each set are arranged radially at diametrically opposite points in the distributor 90 degrees from the superposed ball brushes, as best shown in Figure 5, and these ball brushes ride upon the concave surface of the intermediate contact ring 20.

One set of brushes only is wired as follows.

A circuit wire 29 leads from the ball brush 28 to conduct current from the intermediate contact ring 20 to one side of each of two push button switches (not shown) on the rim of the vehicle steering wheel. A return wire 30 connects one side of one of the switches to the upper contact ring 19 while a return wire 31 connects the other side of the other push button switch to the lower contact ring 21. These circuit wires are conducted from the push button switches to the contact rings through a tube 32 concealed in one spoke and in the rim of the steering wheel as described in my co-pending application filed of even date herewith, Serial No. 67,962.

Each ball brush is mounted in a tubular housing 33 which contains a helical spring 34 that is confined under tension against the ball by means of a screw 35 which is screwed into the outer end of the housing and also provides means for attaching the associated circuit wire.

As best shown in Figure 2, a circuit wire 36 from one of the turn indicating signal lamps, such as for example, the left turn signal lamp, is conducted through the steering column and into the recess 17 in the base flange of the collector ring. The wire is connected by a screw 37 to a bar 38 which is imbedded in the collector ring and is terminally connected to the lower contact ring 21. In a similar manner a conductor wire 39 is conducted from the battery of the vehicle through the steering column and is attached by means of a screw 40 to a bar 41 which is imbedded in the collector ring and is connected to the intermediate or current supply contact ring 20 from which current is supplied to the associated push button switch on the steering wheel for closing the circuit through said turn indicating lamp. A conductor wire 42 is connected to the other turn signal lamp, for example the right turn signal lamp, through the steering column 13 and is connected by a screw 43 to a bar 44 which is imbedded in the collector ring and is electrically connected to the upper contact ring 19. Upon closing of the push button switch to the last named signal lamp the circuit will be closed at the switch from the battery to the last named signal lamp through the wires 39 and 43 and associated brushes and wires leading therefrom to the switch.

It will be seen that the circuit wires in the steering wheel are connected to but one set of superposed brushes and an associated single brush. The other set of superposed brushes and remaining single brush being disposed diametrically opposite those brushes to which circuit wires are attached, will form anti-friction bearings which coact with the brushes carrying the circuit wires to center and stabilize the distributor 22 so that the latter will not wobble and will turn uniformly and truly on its axis thus minimizing uneven wear and adding to the long life and durability of the parts.

It also will be pointed out that the pressure of the springs 34 upon the ball brushes may be increased by tightening the associated screws so that good electrical contact will be maintained between the brushes and their associated contact rings at all times.

A dust cap 45 is mounted on the steering column 13 by means of a pair of screws 46 and houses the collector ring and the distributor.

Since the operation of the device has been described as the description of the parts progressed it is thought that the construction and operation will now be fully understood without further explanation.

What is claimed is:

A device for conducting turn signal circuit wires from steering wheel switches through the steering column of a motor vehicle comprising a distributor movable as a unit with the wheel, a stationary collector ring on the column supporting the distributor and having upper, lower, and intermediate contact rings thereon, brushes carried by the distributor and disposed in duplicate sets of three brushes each, two brushes of each set being arranged in superposed position at diametrically opposite points in the distributor, the third brush of each set being arranged at diametrically opposite points in the distributor 90 degrees from the superposed brushes, the upper and lower brushes of each superposed pair engaging the upper and lower contact rings, the third brush of each set engaging the intermediate contact ring, circuit wires from the switches connected to one set of said brushes, the unwired set of brushes coacting with the wired set of brushes in centering the distributor and stabilizing the same against wobbling on the collector ring, and circuit wires connected to said contact rings and entering the column.

CONSTANTINE A. BRAUN.